Aug. 31, 1943.  C. B. MOORE  2,328,163
MEASURING INSTRUMENT
Original Filed March 8, 1938  2 Sheets-Sheet 2

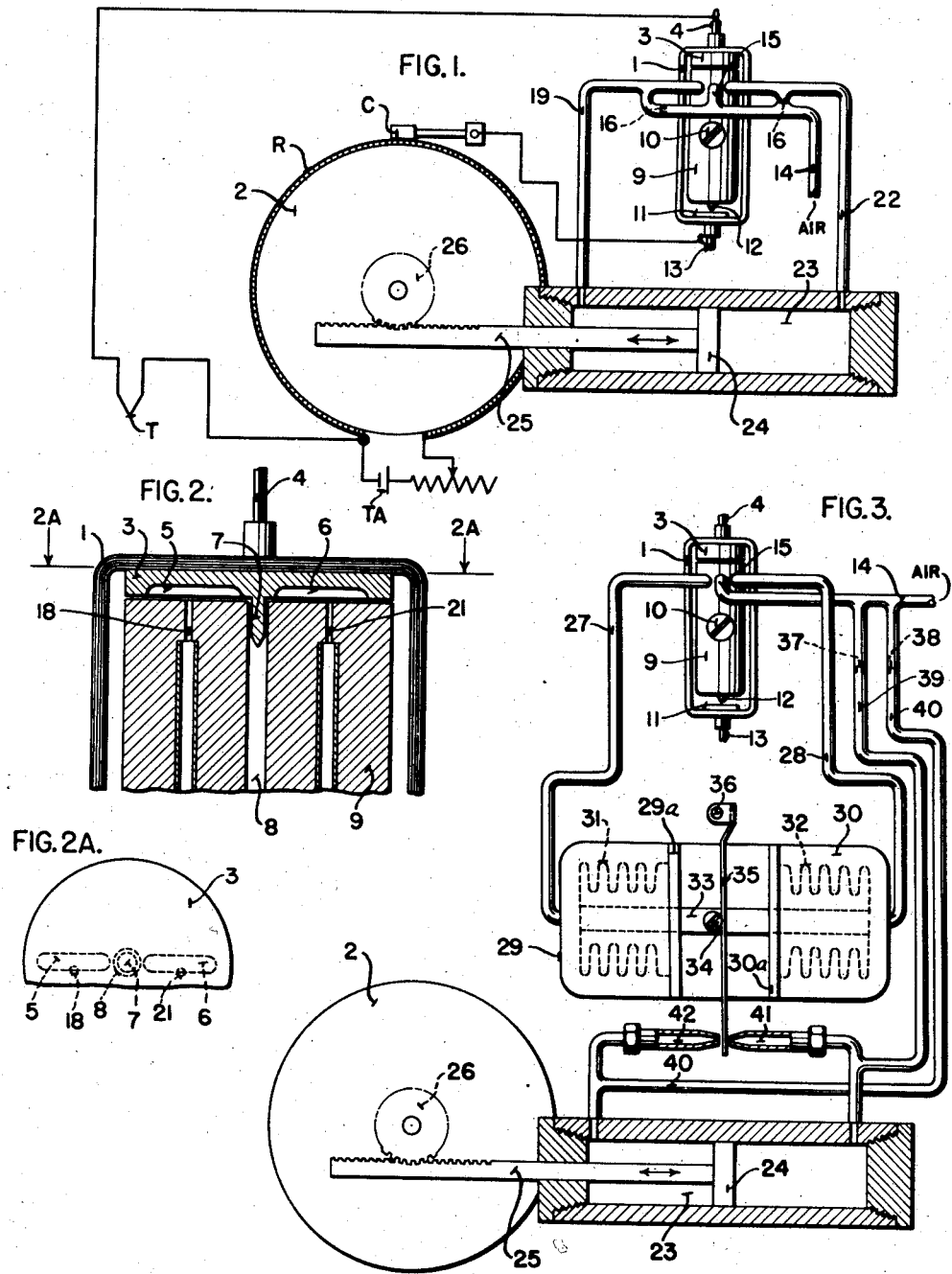

INVENTOR
COLEMAN B. MOORE
BY
ATTORNEY

Patented Aug. 31, 1943

2,328,163

UNITED STATES PATENT OFFICE 2,328,163

MEASURING INSTRUMENT

Coleman B. Moore, Carroll Park, Pa., assignor to The Brown Instrument Company, Philadelphia, Pa., a corporation of Pennsylvania Original application March 8, 1938, Serial No. 194,582, now Patent No. 2,242,656, dated May 20, 1941. Divided and this application October 7, 1939, Serial No. 298,350

5 Claims. (Cl. 171—229)

This invention is a division of my copending application Serial Number 194,582, filed March 8, 1938, which has matured into Patent Number 2,242,656 dated May 20, 1941 and relates broadly to means for effecting a controlling operation in response to the variation in some measurable variable condition, such as the variation in current flowing from a thermocouple.

More specifically, I have devised a means for varying the setting of a potentiometer slide-wire, that is part of a potentiometer circuit, by a pneumatically operated system which is free in a large part from the usual mechanical disadvantages attendant upon link and lever arrangements that are ordinarily used. In the system devised by me, any deflection of a galvanometer, connected in a measuring circuit, is caused to vary the pressure of a fluid acting on a piston in a cylinder, thus causing the piston to change its position and vary the setting of a potentiometer slide-wire.

It is a further object of my invention to use a floating coil galvanometer of the type above mentioned to control an air actuated motor that is used to position a potentiometer slide-wire.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 1 of the drawings shows one form of my invention with parts thereof in section;

Fig. 2 is a sectional view of the galvanometer used in Fig. 1;

Fig. 2A is a view from the top of Fig. 2 omitting the galvanometer coil;

Fig. 3 is a view of another form of my invention with parts in section;

Figure 4:
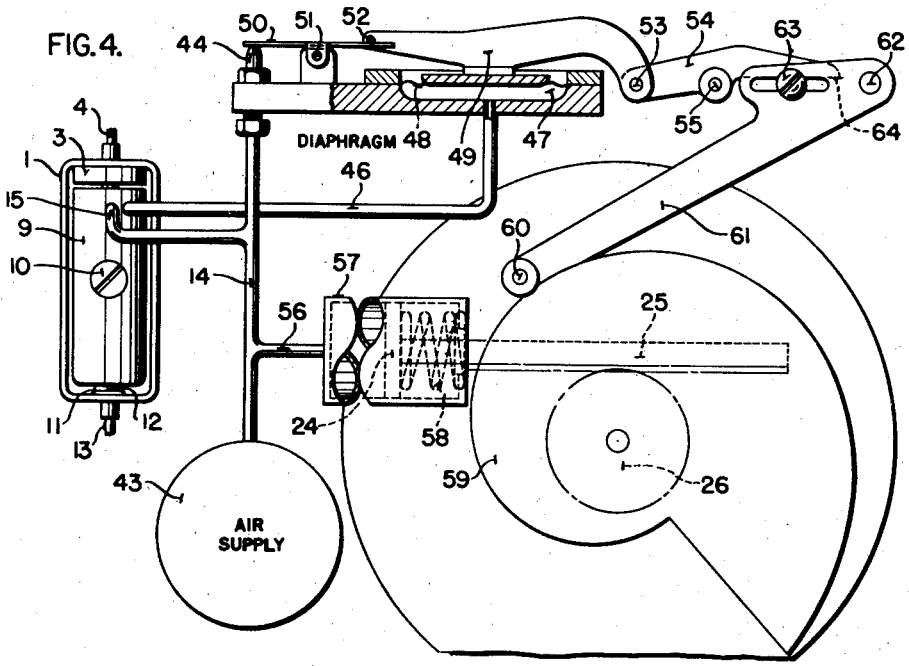
Fig. 4 shows still another form of the invention with a follow-up thereon.

In Fig. 1 there is shown a pneumatic means for varying the position of a potentiometer slide-wire that consists of a floating coil galvanometer having a coil 1 that is connected in circuit with a thermocouple, or some other source of measurable current. As the current changes in magnitude, it causes the coil of the galvanometer to change its angular position, to adjust, through suitable controls, a potentiometer slide-wire 2 that is connected in any suitable potentiometer or other null point circuit to rebalance the galvanometer. The position of the slide-wire, through some suitable means, may then be used to indicate, record, and/or control the condition to which the thermocouple is responsive.

Potentiometric circuits of the type contemplated herein are well known, such, for example, as disclosed in the Harrison Patent 1,898,124, and include a known source of voltage TA impressed across a resistor R carried by the slide-wire disc 2, commonly termed the instrument slide-wire, the galvanometer and source of variable voltage, such as a thermocouple T, being connected in series to oppose the known voltage across a variable portion of said resistor. The portion of the resistor R in circuit is determined by the position of a contact C along the slide-wire, the slide-wire and contact being relatively movable. When the variable voltage, for a given adjustment of the slide-wire, is equal and opposite to the known voltage, the galvanometer is in its null position, but on an increase above or decrease below the known voltage of the unknown voltage, the galvanometer will be deflected in one direction or the other respectively proportionately to the magnitude of the increase or decrease. This invention is concerned with the means by which deflections of said galvanometer control slide-wire adjustments to continuously rebalance the potentiometer system.

The galvanometer coil 1 is attached to a suitable cap 3 that has on its upper side an electrical connection 4, and is formed on its lower side with two radial grooves 5 and 6. The cap or disc 3 has attached at its center a perpendicular, pointed pin 7 which loosely fits in passage 8 of the base 9, of any suitable magnetic core material, that is rigidly attached to any suitable support by screw 10. The coil 1 circles the base 9, and has attached to its lower side another electrical connection 13, that also acts to limit the upward movement of the cap 3 to control the width of the air gap between the cap and base member 9. A plate 11 attached to the lower side of the coil 1 is adapted to abut against a stop 12 on the base 9 to prevent undue movement between the two during shipment.

Air from a suitably regulated source of constant pressure enters a conduit 14 which has three branches, one of which, indicated at 15, leads directly to passage 8 in the galvanometer base 9. As the air enters this passage, it is diverted by the pin 7 and tends to escape from between the cap and base in a thin film that serves to lift the cap 3 and coil 1 off the base 9. In this fashion, the coil 1 is really floating on a film of air and is able to deflect in accordance with the variations of the thermocouple voltage practically without friction.

Each of the other two branches 19 and 22 of the conduit 14 has in it a restriction 16, and each leads to one of a pair of ports 18 or 21 in the base 9 and to one end of a cylinder 23. The ports 18 and 21 are in a line that is paralleled to and slightly spaced from a diameter of the base 9, so that they are each about half covered by an edge of the corresponding groove 5, 6 in the cap 3. In this manner, the air escaping from passage 8 is variably throttled to create a pressure in the ports 18 and 21 that varies as the cap turns to increase the opening of one port and decrease the opening of the other. The cylinder 23 has a piston 24 therein whose piston rod 25 is formed at its outer end with teeth meshing with a pinion 26 that is attached to and turns with the slide-wire 2.

In the operation of this modification, as the galvanometer coil deflects, the edge of slot 5, 6 in the cap 3 acts on the ports 18 and 21 to increase the opening of one and decrease it on the other, thereby building up a differential pressure across the piston 24 in cylinder 23. Due to this differential, the piston 24 is moved one way or the other to rotate pinion 26 and adjust the slide-wire 2 in a direction to rebalance the galvanometer circuit. This in turn again equalizes the pressure on the ends of the piston 24 to keep the slide-wire in its adjusted position.

The modification of Fig. 3 is similar to that of Fig. 1, except that the differential pressure created in the galvanometer is applied to a relay device instead of being applied direct to the power cylinder. Air is supplied through conduit 14 to branch 15 which leads to passage 8, as in Fig. 1, to float cap 3. This air tends to escape through ports 18 and 21, as well as between the edges of the cap and base 9 to build up a pressure in the ports 18 and 21 and the conduits 27 and 28, respectively, leading therefrom, to actuate a relay device consisting of the chambers 29 and 30 in which are situated bellows 31 and 32. These bellows are fastened to the base plates 29a and 30a respectively, in an air-tight manner, and their interiors are left open to the atmosphere.

Upon a deflection of the galvanometer coil, the edge of slot 5, for example, will uncover port 18, while the edge of slot 6 covers port 21. Accordingly, pressure will be built up in port 18, conduit 27 and chamber 29 to compress bellows 31, as a reverse action takes place in port 21 to cause a reduction of pressure in chamber 30 and an expansion of bellows 32. A rod 33, fastened at its ends to the movable end walls of bellows 31 and 32, and passing through plates 29a and 30a, will be moved to the right when this occurs, so that the projection 34 on it engages a flapper 35 pivoted at 36, to move the flapper in counter-clockwise direction against its normal gravitational and/or spring bias which tends to maintain it in contact with the pin 34.

Leading from the supply duct 14, through restrictions 37 and 38, are two conduits 39 and 40, one of which, conduit 39, diverges at its lower end, one branch leading to one end of the cylinder 23, and the other branch leading to a pilot nozzle 41. Conduit 40 branches also, one branch leading to the other end of cylinder 23, and the other branch leading to a pilot nozzle 42. In its mid-position the flapper 35 is positioned an equal distance from the openings of the two nozzles, so that air flowing through the restrictions 37 and 38 can escape at an equal rate through nozzles 41 and 42.

As the flapper 35 is moved counter-clockwise, as above described, it will move toward nozzle 41 and further away from nozzle 42, thus causing pressure to build up in the conduit 39 and in the right end of cylinder 23, with a corresponding decrease in pressure in conduit 40 and the left end of cylinder 23. Due to the difference in pressure in the ends of the cylinder, the piston will move to the left and rotate the slide-wire clockwise. A deviation of the galvanometer in the other direction will cause a corresponding, but reverse, action to occur to move the slide-wire counter-clockwise.

In Figs. 1–3, the actuating piston 24 may be termed a "floating" device in the sense that no definite relationship exists between the position of the piston and the pressure by which it is actuated. The galvanometer will be displaced whenever an unbalance exists in the measuring circuit, and piston 24, as a result of the pressure differential created by the galvanometer displacement, will be moved continuously until the pressure difference across the galvanometer is eliminated by potentiometer rebalance. Under conditions calling for high velocities of the moving parts, the inertia of those parts may give rise to hunting or oscillation, and through the piston 24 of Figs. 1–3 may be suitably damped, I prefer to use an arrangement such as is shown in Figs. 4 and 5 which facilitates a high speed of rebalancing action without hunting.

Figure 5:
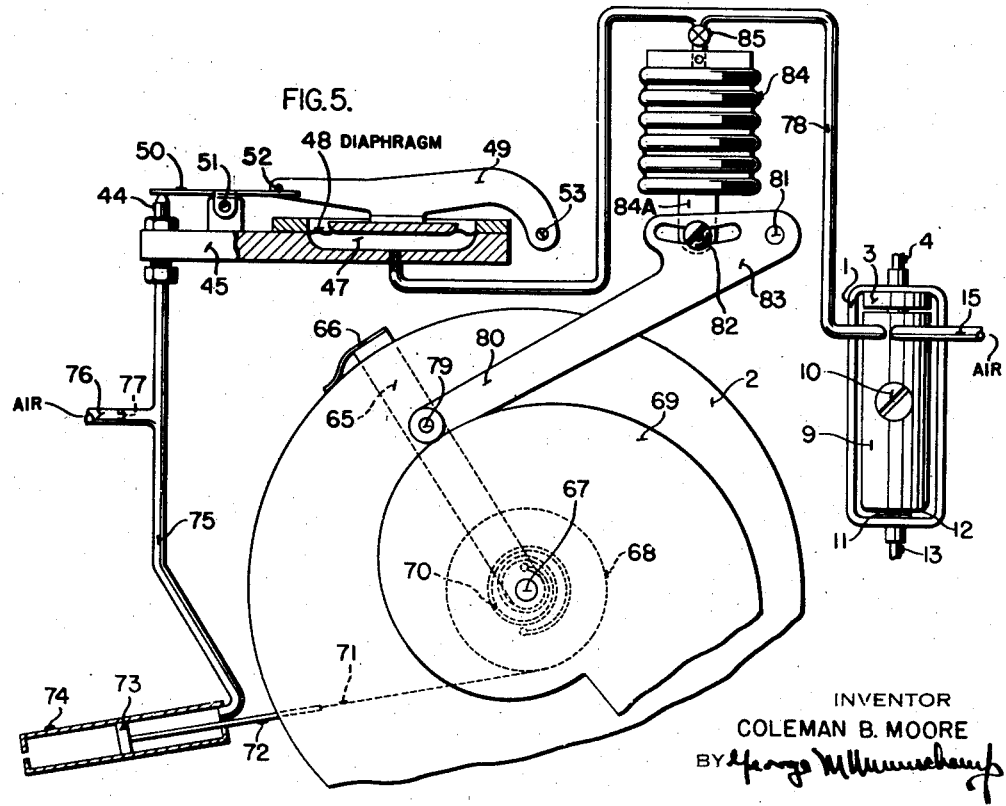
Fig. 5 is a modification of the invention with a different type of follow-up.

In Figs. 4 and 5, the piston 24 is not "floating" as in the case of Figs. 1–3, but is spring urged against a loading air pressure controlled by the galvanometer. The piston is thereby moved into a position dependent upon the balance of the air pressure upon the piston in one direction and the opposing spring force, the latter of which increases in substantial linear proportion to its compression, as is well known.

The galvanometer of Fig. 4 differs from that of Figs. 1–3, in that it has only one control port, which may be either 18 or 21, as convenient. The galvanometer coil is floated by air supplied from conduit 14 to conduit 15, such supply in this instance being shown as coming from a source 43 that may be either a small compressor or a storage tank. Such supply may be either of the constant volume variety or may be a suitably restricted constant pressure supply. The upper end of conduit 14 has attached to it a small bleed nozzle 44 which is fastened in a support 45. Upon deviation of the galvanometer, pressure will build up or decrease through port 21 to conduit 46 which terminates in a chamber 47 that is closed by a diaphragm 48. This diaphragm is formed of a thin flexible material, such as rubber, and has resting upon it a plate that is attached to loading lever 49. A flapper 50 for varying the amount of air escaping from nozzle 44 is pivoted at 51, and has a normal gravitational bias in a counter-clockwise direction against the action of pin 52 on the end of loading lever 49, the other end of which is pivoted at 53 on one end of link 54, that is in turn pivoted at 55 and has a gravitational and/or spring bias in a clockwise direction.

The slide-wire 2 is rotated in one direction in this modification by air supplied from branch 56 of conduit 14 that leads to the left end of a cylinder 57, and in the other direction by spring 58 in the right end of the cylinder that is open to the atmosphere. Slidable in the cylinder is piston 24, having one face acted on by air from the branch 56, and having the other end acted on by spring 58. The piston rod 25 has rack teeth on it that mesh with the pinion 26 on the slide-wire shaft as in Figs. 1 and 3.

As the galvanometer coil deviates from neutral, it will vary the restriction of port 21 to thereby change the pressure of the air in chamber 47. If the deflection of the galvanometer is such that an increase in pressure is created in conduit 46, the diaphragm 48 will be raised, moving loading lever 49 clockwise around its pivot 53 to allow flapper 50 to move nearer nozzle 44 raising the pressure in cylinder 47, moving piston 24 to the right, and rotating the slide-wire in a clockwise direction.

In order for the motion of the slide-wire to oppose the pressure change in the cylinder and therefore prevent the slide-wire from over-shooting and thereby causing a hunting action, as well as to permit the galvanometer to return to normal while permitting the pressure in cylinder 57 to remain sufficient to maintain the slide-wire adjustment, a follow-up is provided. This follow-up gradually reduces the pressure in the cylinder as the slide-wire rotates in response to a pressure increase and increases the pressure in the cylinder as the slide-wire rotates in response to a pressure decrease. This is accomplished by having a cam 59 attached to the slide-wire shaft and rotating therewith, which is adapted to be engaged by a roller 60 carried by lever 61 pivoted at 62. Lever 61 carries a pin 63 adjustable radially of pivot 62 and adapted to engage the edge of a lever 54 pivoted to the instrument framework at 55 and pivotally connected to lever 49 at 53. As the slide-wire rotates in a clockwise direction, the portion of the cam under roller 60 gradually becomes of smaller radius, so that lever 61 is lowered or turned in a counter-clockwise direction to lower pin 63. Lowering of pin 63 will lower the right end of link 54, and thereby through connection 53, raise the right-hand end of the loading lever 49 on diaphragm 48 as a fulcrum to restore the flapper toward its original position. The diaphragm 48 may be limp so that its loading tendency, including the weight of the associated parts, opposing the pressure in chamber 47, is constant, and within its range of action it may move continuously on a rise above or decrease below that loading force of the pressure in the chamber. In consequence, a return to neutral of the galvanometer may occur with the diaphragm 48 in a new position, which position, together with the position of lever 54, will jointly determine the position of flapper 50 and thereby the pressure in cylinder 57. The latter pressure, with the proper adjustment and proportioning of the parts including pin 63 and the edge of cam 59, will be just sufficient to maintain the proper adjustment of slide-wire 2 against the bias of spring 58. Alternatively, diaphragm 48 may have a normal resiliency, as a result of which, pressure in the chamber 47 may be different for different positions of the slide-wire. So arranged, a slight but practically negligible displacement of the galvanometer may be required at the point of equilibrium. This displacement in a practical device can be less than the permissible "neutral" existing in practically all commercial self-balancing potentiometers now in use.

It should be noted that in the system as shown in the drawings, with an increase in pressure in the power cylinder, there will also be an increase in pressure to the supply for the floating coil of the galvanometer. Since, however, the galvanometer coil is floating, the pressure underneath cap 3 is more or less regulated by the weight of the floating part, acting similar to a pressure regulator for the port 21 opening to conduit 46. There will, however, be a slight variation in pressure due to a change in velocity of the air passing through the port 21. To insure the galvanometer coil floating at all times, it is necessary to have the maximum and minimum cylinder pressure above that required to float the galvanometer coil.

In some cases, it may be desirable to supply the floating coil with a separate regulated air supply in order to keep the pressure variation required to drive the slide-wire separate from the floating coil itself. Such an arrangement is shown in the modification of Fig. 5.

The modification of Fig. 5 secures a follow-up operation generally equivalent to that of Fig. 4, but differs therefrom in various details. In this form of the invention the slide-wire 2 is held from rotating, while an arm 65, having the potentiometer slide-wire contact 66 thereon, is mounted on shaft 67 for rotation therewith. As the contact 66 moves around the slide-wire, it varies the resistance in the galvanometer circuit to rebalance the potentiometer circuit and restore the galvanometer to neutral position. Also mounted on and rotatable with shaft 67 is a pulley 68 and a cam 69. The shaft and its associated parts are biased in a counter-clockwise direction by spring 70 against the pull of wire 71 that is fastened at one end to the pulley, and, at the other, to piston rod 72 of piston 73. This piston slides in a cylinder 74 that has one end open to the atmosphere, and has the other end connected by conduit 75 with nozzle 44 and supply 76. Between the supply and the conduit 75 is a restriction 77 that serves to reduce the pressure supply to the cylinder and the nozzle. The piston 73 of Fig. 5 is subjected to a constant spring force by virtue of the construction of spring 70 which may consist of a sufficient number of turns to make its force substantially constant throughout its range of action.

Upon a deflection of the galvanometer in a direction, for example, to permit an increase in the amount of opening of the port 18 in this modification, pressure will build up in the conduit 78 leading to the chamber 47. As the pressure in the chamber increases, diaphragm 48 will be lifted to move loading lever 49 around its pivot 53, which is fixed in this embodiment, in a direction that will allow flapper 50 to move toward the nozzle 44. The pressure in conduit 75 and the cylinder 74 will thereby build up to move piston 73 to the left against the force of spring 70, thus rotating shaft 67 and contact 66 clockwise.

In lieu of the mechanical stabilizing means of Fig. 4, I provide in Fig. 5 a pneumatic device including a bellows 84 communicating with conduit 78 and fixed to a pivoted end head. A part 84A fixed to the free end of bellows 84 is attached to lever 80 by means of a screw 82 in a slot 83 of the lever 80 which is pivoted at 81. Lever 80 carries a roller 79 engaging the edge of a cam 69. Cam 69 which is fixed to and rotates with shaft 67 will in its clockwise rotation gradually decrease in radius with respect to roller 79. Therefore, as the cam rotates, lever 80 will move downwardly about its axis 81 and through connection 84A expand the bellows 84. Expansion of the bellows will reduce the pressure in conduit 78 and chamber 47, as a result of which the diaphragm 48 and loading lever 49 will lift the flapper from nozzle 44. With the proper volumetric proportion of the bellows 84 and its connection to chamber 47 which may be adjusted by a variable restriction 85 and of the mechanical actuating connections for the bellows all as related to the inertia of the moving elements including galvanometer 1, at the end of the rebalancing movement of contact 66, the flapper 50 will be in its original position, and the air pressure in cylinder 74 will just be sufficient to balance the force of spring 70. The system is now again in a state of equilibrium with the contact 66 in its new position.

Though the pivot 53 in the apparatus just described is fixed as it should be when the spring 70 is a constant force spring, a variable force spring such as the spring 58 of Fig. 4 may be used in place of spring 70. So arranged, the pivot 53 may be made movable to compensate for the pressure change necessary to maintain the slide-wire in a different position, notwithstanding the return of the galvanometer to its normal position. Such compensating motion may be effected with the mechanism of Fig. 4 added to that of Fig. 5 which really amounts only to the addition of the lever 54.

It will be seen from the above disclosure that I have invented a new form of galvanometer that eliminates the necessity of a galvanometer pointer and attendant periodic contact by a "feeler," or the like, and of delicate suspensions and pivots therefor.

Because the coil of the galvanometer is floating on air, only a negligible amount of power is needed to cause a deflection thereof, and immediately upon the occurrence of a deflection, the balancing operation is started, and continues without interruption until it is completed. The slide-wire may be moved full-scale in one continuous movement at high speed but with stabilized motion.

Another advantage of the above-described systems is that no change in the galvanometer sensitivity is needed for different scale ranges, since the slide-wire continues to move regardless of the galvanometer deflection, until it is rebalanced at zero.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a self-balancing potentiometer, the combination with a potentiometer circuit of a galvanometer adapted to deflect from a neutral position in response to potentiometer circuit unbalance, movable fluid pressure rebalancing mechanism including a member adapted to be set in operation in one direction or in the opposite direction by an increase or decrease respectively of the fluid pressure acting on said member, a valve continuously adjusted by the galvanometer to regulate said pressure accordingly as the galvanometer deflection is in one direction or the other from said neutral position, means operable by said rebalancing mechanism to readjust said valve directly and terminate said operation, and means operated by said rebalancing mechanism to rebalance the potentiometer circuit.

2. In a self-balancing potentiometer, the combination with a potentiometer circuit of a galvanometer adapted to deflect in accordance with potentiometer circuit unbalance, an angularly adjustable rebalancing element, a fluid pressure motor including a part movable to and fro in response to changes in fluid pressure acting on said motor, means connecting said part and element whereby the latter is angularly adjusted in accordance with movement of said part, means operated by said element to rebalance said potentiometer circuit, and valve means continuously and jointly controlled by the deflection of said galvanometer and the angular adjustment of said element for regulating said pressure.

3. In a system of the class described, a normally balanced network including means responsive to the lack of balance of said network, a member, means operated by said member to rebalance said network, pneumatic actuating means for said member movable in accordance with an increase or a decrease of fluid pressure acting thereon, a first valve means to regulate said pressure, a second valve means forming part of said responsive means and continuously acting upon unbalance of said network to adjust said first valve means, and means operated by the rebalancing movements of said member to readjust said first valve means to substantially its original position.

4. In a system of the class described, a normally balanced network including means responsive to the unbalance thereof, a member, means operated by said member to rebalance said network, pneumatic actuating means for said member adapted to be moved to and fro in response to variations of pressure thereon, valve means continuously responsive to movements of said responsive means to change the pressure acting on said actuating means, and means jointly controlled by the movement of said responsive means and said member to return said valve means to substantially its original condition.

5. In a self-balancing potentiometer, the combination with a galvanometer adapted to deflect in response to potentiometer unbalance, a rebalancing element, pneumatic actuating means for said element adapted to be moved to and fro in response to changes in pressure thereon, valve means continuously regulated by deflections of said galvanometer to vary the pressure acting on said actuating means, and means directly actuated by and responsive to movement of said actuating means to partly counteract the pressure changes thereon as regulated by said galvanometer.

COLEMAN B. MOORE.